Feb. 20, 1962  J. L. HART  3,022,135
URANIUM RECOVERY PROCESS
Filed Feb. 26, 1958
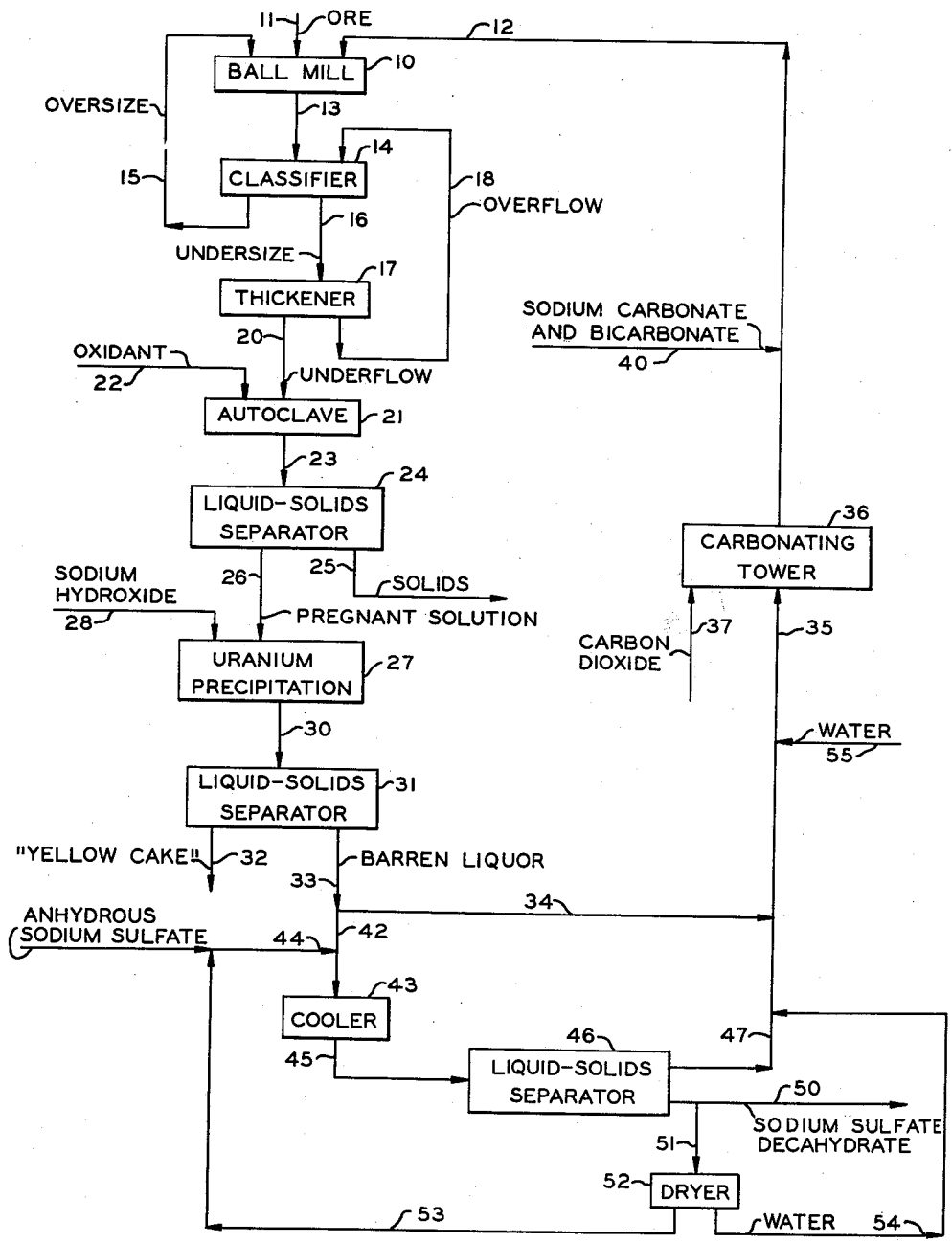
INVENTOR.
J.L. HART
BY Hudson & Young
ATTORNEYS

3,022,135
URANIUM RECOVERY PROCESS
James L. Hart, Bartlesville, Okla., assignor to Phillips Petroleum Company, a corporation of Delaware
Filed Feb. 26, 1958, Ser. No. 717,580
6 Claims. (Cl. 23—14.5)

This invention relates to the recovery of uranium values from uranium containing ores.

In the processing of relatively low grade uranium ores, both acids and carbonate reagents have been employed as leaching materials to dissolve the uranium. For the most part, the alkaline leach has been favored because the corrosion problems in such a system are negligible compared to those in an acid leach. A large portion of the reagents employed in this leach method can be reclaimed and returned to the process. Furthermore, sodium carbonate is a relatively cheap material and offers few disposal problems.

In one embodiment of the carbonate leach process, the crushed ore is mixed with an aqueous solution of sodium carbonate and sodium bicarbonate. An oxidant is employed if the uranium initially is present in the quadrivalent uranous state. The uranium eventually goes into solution as sodium uranyl tricarbonate, $Na_4UO_2(CO_3)_3$. The dissolved uranium is separated from the unreacted solids and is then precipitated from the solution as by the addition of sodium hydroxide. The resulting precipitate, which is commonly referred to as "yellow cake" is recovered. The barren liquor is recycled back to dissolve additional ore after being treated to restore the carbonate concentration to a desired value. Any sulfide materials which may be present in the ore, such as pyrite, consume sodium carbonate during the process to produce sodium sulfate and sodium bicarbonate:

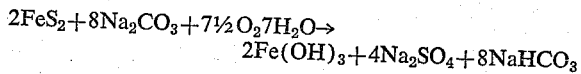

Within limits, this reaction can be beneficial because of the bicarbonate produced. However, if there is more than about 1% pyrite in the ore, the sodium sulfate produced is more than can conveniently be bled from the process as normal losses. This requires that a portion of the sulfate be bled from the system intentionally, as by discarding a portion of the barren solution. Such an additional bleed is undesirable in that it represents a substantial loss of relatively expensive sodium ions. If the ore contains gypsum or magnesium sulfate, these materials also react with the sodium carbonate to produce sodium sulfate.

In accordance with the present invention, an improved process is provided for removing sodium sulfate from the barren liquor without the loss of other valuable reagents therein. The barren liquor is treated with anhydrous or essentially anhydrous sodium sulfate and cooled to precipitate sodium sulfate decahydrate. This decahydrate can subsequently be dehydrated to recover sodium sulfate for additional treatment. The resulting barren liquor, which contains a smaller concentration of sodium sulfate, is returned to the process to leach additional ore.

Accordingly, it is an object of this invention to provide an improved process for recovering uranium values from uranium containing ores.

Another object is to provide a novel procedure for removing sodium sulfate from aqueous solutions employed in carbonate leaching processes.

A further object is to provide an improved process for regenerating barren liquor in a carbonate leach process.

Other objects, advantages and features of the invention should become apparent from the following detailed description in conjunction with the accompanying drawing which is a schematic flow diagram of a uranium recovery process having the present invention incorporated therein.

The present invention will be described in detail in conjunction with a leach process which is particularly adapted for extracting uranium from sandstone types of ores such as coffinite. As will be evident however, the invention is by no means restricted to this specific process or to this specific type of ore. The crushed ore, which preferably does not contain particles larger than approximately 65 mesh, is directed to a ball mill 10 by means of a conveyor 11. An aqueous solution containing approximately 50 grams per liter sodium carbonate and 15 grams per liter sodium bicarbonate is added to ball mill 10 by means of a conduit 12. The resulting slurry is directed through a conduit 13 to the inlet of a classifier 14. Any oversize material is returned to the inlet of ball mill 10 by means of a conveyor 15. The slurry from classifier 14 is directed through a conduit 16 to the inlet of a thickener 17. The overflow from thickener 17 is returned to classifier 14 through a conduit 18, and the thickened slurry, which comprises about 50% by weight of solids, is directed through a conduit 20 to an autoclave 21. An oxidant, such as air, is introduced into autoclave 21 through a conduit 22. The autoclave can advantageously be a series of air agitated tanks which are maintained at a temperature of about 190° F. and at a pressure of approximately 20 p.s.i.a. The total residence time in these tanks is in the order of 60 hours. A small amount of an additional oxidant, such as potassium permanganate, can be added to the slurry to be oxidized to facilitate oxidation.

The uranium is converted to the hexavalent state in autoclave 21 so as to form the uranyl tricarbonate complex ion which is water soluble. The effluent from autoclave 21 is directed through a conduit 23 to the inlet of a liquid-solids separator 24. This separator can be either a filter, a centrifuge, or a countercurrent-decanting system, for example. The solids which have not been dissolved in autoclave 21 are removed from separator 24 through a conveyor 25. The pregnant (uranium containing) solution is removed from separator 24 through a conduit 26 and passed to a precipitation vessel 27. Sodium hydroxide is added to vessel 27 by means of a conduit 28 to cause the uranium to precipitate:

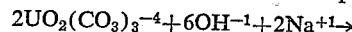
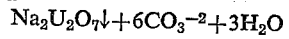

The sodium hydroxide is added in an amount sufficient to provide an excess of approximately ten grams per liter free alkali, and the material is allowed to digest at a temperature of approximately 140° F. The material in vessel 27 is then transferred through a conduit 30 to a liquid-solids separator 31. The resulting precipitate is removed from vessel 31 through a conduit 32. This precipitate represents the desired uranium concentrate, "yellow cake." A portion of the barren liquor removed from separator 31 is directed to a carbonating tower 36 through conduits 33, 34 and 35. Carbonating tower 36 can be a conventional packed column wherein the liquid descends through packing material. Carbon dioxide in the flue gases from the various furnaces employed to supply heat to the process is directed upwardly through tower 36 to contact the descending liquid. This results in the barren liquor being regenerated by the formation of sodium carbonate and sodium bicarbonate:

$$2NaOH + CO_2 \rightarrow Na_2CO_3 + H_2O$$
$$Na_2CO_3 + CO_2 + H_2O \rightarrow 2NaHCO_3$$

The resulting liquor is directed to the inlet of ball mill 10 through conduit 12. Additional sodium carbonate and/or sodium bicarbonate is added to the system as required by means of a conduit 40 which communicates with conduit 12.

A second portion of the barren liquor removed from separator 31 is directed through a conduit 42 to a cooler 43. Anhydrous or essentially anhydrous sodium sulfate is added to this barren liquor by means of a conveyor 44 which communicates with conduit 42. The amount of anhydrous sodium sulfate added is sufficient to provide a solution which is at least saturated, with respect to the sodium sulfate, at a temperature in the range of 50 to 90° F., plus an amount sufficient to combine with the water to be removed by the formation of sodium sulfate decahydrate when the solution is cooled to a temperature in the range of 50 to 90° F. This solution is then cooled to such a temperature by means of cooler 43, which can be any conventional type of cooling means. The cooling of the solution results in the formation of sodium sulfate decahydrate crystals. The outlet of cooler 43 is connected by conduit 45 to the inlet of a liquid-solids separator 46, which also can be any conventional type of separating means. The resulting liquid is returned to conduit 35 by a conduit 47. The sodium sulfate decahydrate crystals are removed from separator 46 through a conveyor 50. A portion of these crystals is directed through a conveyor 51 to a dryer 52 wherein the crystals are dehydrated to form anhydrous sodium sulfate and water. The anhydrous sodium sulfate is returned to conveyor 44 through a conveyor 53, and the water is returned to conduit 47 through a conduit 54. The excess sodium sulfate decahydrate, which is removed through conveyor 50, can subsequently be recovered as a product. Any additional water which is required in the system to compensate for losses can be added by means of a conduit 55 which communicates with conduit 35.

As a specific example of the operation of the barren liquor regenerating system of this invention, approximately one-tenth of the total barren liquor removed from separator 31 is directed through conduit 42. This barren liquor is at a temperature of approximately 140° F. Each liter of the barren liquor, which is nearly saturated with sodium sulfate, is treated with approximately 400 grams of anhydrous sodium sulfate and cooled to a temperature of approximately 75° F. The cooled solution is agitated for a few minutes in cooler 43 to form sodium sulfate decahydrate crystals. The filtrate from separator 46 constitutes approximately 50% by volume of the original barren liquor directed through conduit 42. This filtrate contains approximately 100 grams per liter sodium carbonate, 20 grams per liter sodium hydroxide and 200 grams per liter sodium sulfate. The sodium sulfate decahydrate crystals are dried at a temperature of 212° F. This results in the recovery of approximately 500 grams of anhydrous sodium sulfate per liter of the original treated barren liquor. Since only 400 grams are needed in the process, the remainder can be recovered as product. Thus, only four-fifths of the crystals from separator 46 need be passed to dryer 52. The remaining one-fifth is removed by conveyor 50.

From this example it should be evident that the net effect of the process is the removal of 100 grams of sodium sulfate per liter of barren solution. In order to remove a comparable amount of sodium sulfate by the procedures employed heretofore, it would be necessary to discard approximately one-half liter of barren liquor. This would result in the loss of the sodium carbonate and sodium hydroxide contained therein. It should thus be evident that the process of this invention offers a decided improvement in the regeneration of barren liquor in uranium recovery processes.

As another example of this invention, 500 cc. of an aqueous solution containing 40 grams per liter sodium carbonate and 15 grams per liter sodium bicarbonate was treated with 85 cc. of a sodium hydroxide solution containing 10 percent by weight of sodium hydroxide. Three hundred grams of anhydrous sodium sulfate was added to this solution. The slurry was heated and a sample was removed at a temperature of 100° F. This sample contained 9.6 grams per liter sodium hydroxide, 50.9 grams per liter sodium carbonate and 364.3 grams per liter sodium sulfate. The slurry was then cooled to 80° F., whereupon sodium sulfate decahydrate crystallized out from the mother liquor. The mother liquor contained 20.4 grams per liter sodium hydroxide, 95.4 grams per liter sodium carbonate and 228.6 grams per liter sodium sulfate. Thus, the treatment of the barren liquor resulted in a decrease in the concentration of sodium sulfate from 364.3 to 228.6 grams per liter. At the same time, there was an approximate twofold increase in the concentration of sodium hydroxide and sodium carbonate.

While the invention has been described in conjunction with a present preferred embodiment, it should be evident that it is not limited thereto.

What is claimed is:

1. The method of extracting uranium values from a sulfur containing uranium bearing ore which comprises contacting the ore with an aqueous solution of sodium carbonate and sodium bicarbonate so as to form a water soluble uranium compound; separating undissolved solids; treating the resulting liquid to precipitate uranium containing material; separating the precipitate from the resulting barren liquid; and removing excess sodium sulfate from the barren liquid by adding anhydrous sodium sulfate to at least a part of said barren liquid and cooling same to form sodium sulfate decahydrate, and removing said sodium sulfate decahydrate; and contacting additional ore with the final resulting liquid having sodium sulfate decahydrate removed therefrom.

2. The method of claim 1 further comprising the step of contacting said final resulting liquid with carbon dioxide prior to contacting additional ore.

3. The method of claim 1 wherein said resulting liquid is treated by contacting same with sodium hydroxide to precipitate said urnaium containing material.

4. The method of claim 1 further comprising the step of dehydrating at least a portion of the removed sodium sulfate decahydrate, and contacting additional barren liquid with the resulting anhydrous sodium sulfate.

5. The method of claim 4 further comprising the step of adding the water obtained from the dehydrating step to said final resulting liquid which is used to contact additional ore.

6. The method of extracting uranium values from a sulfur containing uranium bearing ore which comprises contacting the ore with an aqueous solution of sodium carbonate and sodium bicarbonate so as to form a water soluble uranium compound; separating undissolved solids; treating the resulting liquid to precipitate uranium containing material; separating the precipitate from the resulting barren liquid; and removing excess sodium sulfate from the barren liquid by adding anhydrous sodium sulfate to at least a part of said barren liquid in an amount sufficient to form a solution which is at least saturated at a temperature in the range of 50 to 90° F. and cooling same to said temperature, and removing said sodium sulfate decahydrate; and contacting additional ore with the final resulting liquid having sodium sulfate decahydrate removed therefrom.

References Cited in the file of this patent

UNITED STATES PATENTS

| | | |
|---|---|---|
| 1,886,580 | Pierce | Nov. 8, 1932 |
| 2,034,999 | Staib et al. | Mar. 24, 1936 |
| 2,762,685 | Brundin | Sept. 11, 1956 |
| 2,813,003 | Thunaes et al. | Nov. 12, 1957 |

FOREIGN PATENTS

| | | |
|---|---|---|
| 133,195 | Australia | June 16, 1949 |
| 517,955 | Canada | Oct. 25, 1955 |

OTHER REFERENCES

Stephens et al.: "Proceedings of the International Conference on the Peaceful Uses of Atomic Energy," Aug. 8–20, 1955, vol. 8, pp. 18–25.